United States Patent
Schmid et al.

(10) Patent No.: US 9,427,775 B2
(45) Date of Patent: Aug. 30, 2016

(54) USE OF PERLITE BASED EFFECT PIGMENTS FOR FINISHES WITH ANTIQUE, OR PATINA APPEARANCE

(75) Inventors: Raimund Schmid, Neustadt (DE); Ellen Schmidt, Worms (DE)

(73) Assignee: BASF SE, Ludwigshafen (DE)

( * ) Notice: Subject to any disclaimer, the term of this patent is extended or adjusted under 35 U.S.C. 154(b) by 724 days.

(21) Appl. No.: 13/190,760

(22) Filed: Jul. 26, 2011

(65) Prior Publication Data
US 2012/0027993 A1 Feb. 2, 2012

Related U.S. Application Data

(60) Provisional application No. 61/368,288, filed on Jul. 28, 2010.

(51) Int. Cl.
| | | |
|---|---|---|
| *B05D 5/00* | (2006.01) | |
| *B05D 5/06* | (2006.01) | |
| *C09D 5/28* | (2006.01) | |
| *C09D 5/36* | (2006.01) | |
| *C09D 7/12* | (2006.01) | |
| *B05D 7/00* | (2006.01) | |

(52) U.S. Cl.
CPC ............. *B05D 5/061* (2013.01); *C09D 5/28* (2013.01); *C09D 5/36* (2013.01); *C09D 7/1225* (2013.01); *B05D 5/062* (2013.01); *B05D 7/52* (2013.01); *B05D 7/56* (2013.01); *Y10T 428/24355* (2015.01)

(58) Field of Classification Search
CPC ............ B32B 3/26; C09D 1/00; C09D 5/28; C09D 5/36; B05D 5/061; B05D 5/02; B05D 5/00; B05D 5/062
USPC .............. 427/256, 267, 280; 428/141
See application file for complete search history.

(56) References Cited

U.S. PATENT DOCUMENTS

| | | | | |
|---|---|---|---|---|
| 4,416,940 | A | * | 11/1983 | Loye et al. ............ 428/324 |
| 5,075,137 | A | * | 12/1991 | Kuras .................... 427/204 |
| 6,017,599 | A | | 1/2000 | Sakamoto et al. |
| 2010/0203093 | A1 | | 8/2010 | Bujard et al. |
| 2011/0269845 | A1 | | 11/2011 | Bujard et al. |

FOREIGN PATENT DOCUMENTS

| | | | |
|---|---|---|---|
| EP | 0712718 | | 5/1996 |
| FR | 2922893 | | 5/2009 |
| GB | 1368756 | | 10/1974 |
| JP | 63-209773 | | 8/1988 |
| WO | 2009007248 | | 1/2009 |
| WO | 2010066605 | * | 6/2010 |

OTHER PUBLICATIONS

Copending U.S. Appl. No. 61/255,514, filed Oct. 28, 2009.
Copending U.S. Appl. No. 61/301,245, filed Feb. 4, 2010.
English Language Partial Translation and Abstract for JP63-209773, (3 pages); 1988.

* cited by examiner

*Primary Examiner* — William Phillip Fletcher, III
(74) *Attorney, Agent, or Firm* — Marshall, Gerstein & Borun LLP

(57) ABSTRACT

The present invention provides a process for imparting a simulated patina, or antique appearance to a substrate by using a coating composition comprising a perlite based effect pigment. The perlite based effect pigment functions as colorant and matting agent and shows an almost angle independent brightness. The process provides, for example, decorative wall coatings showing enhanced antique, or patina effects as compared to conventional effect pigments on basis of mica.

12 Claims, 2 Drawing Sheets

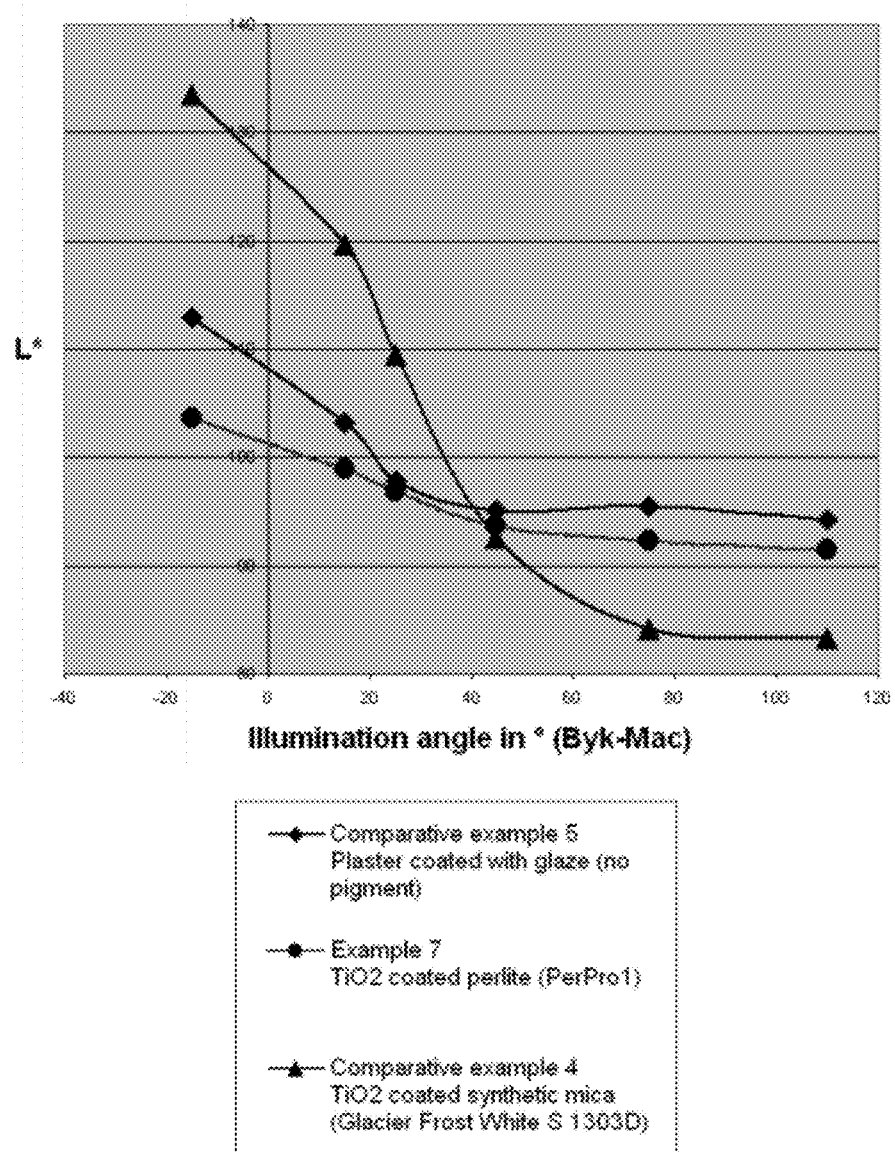

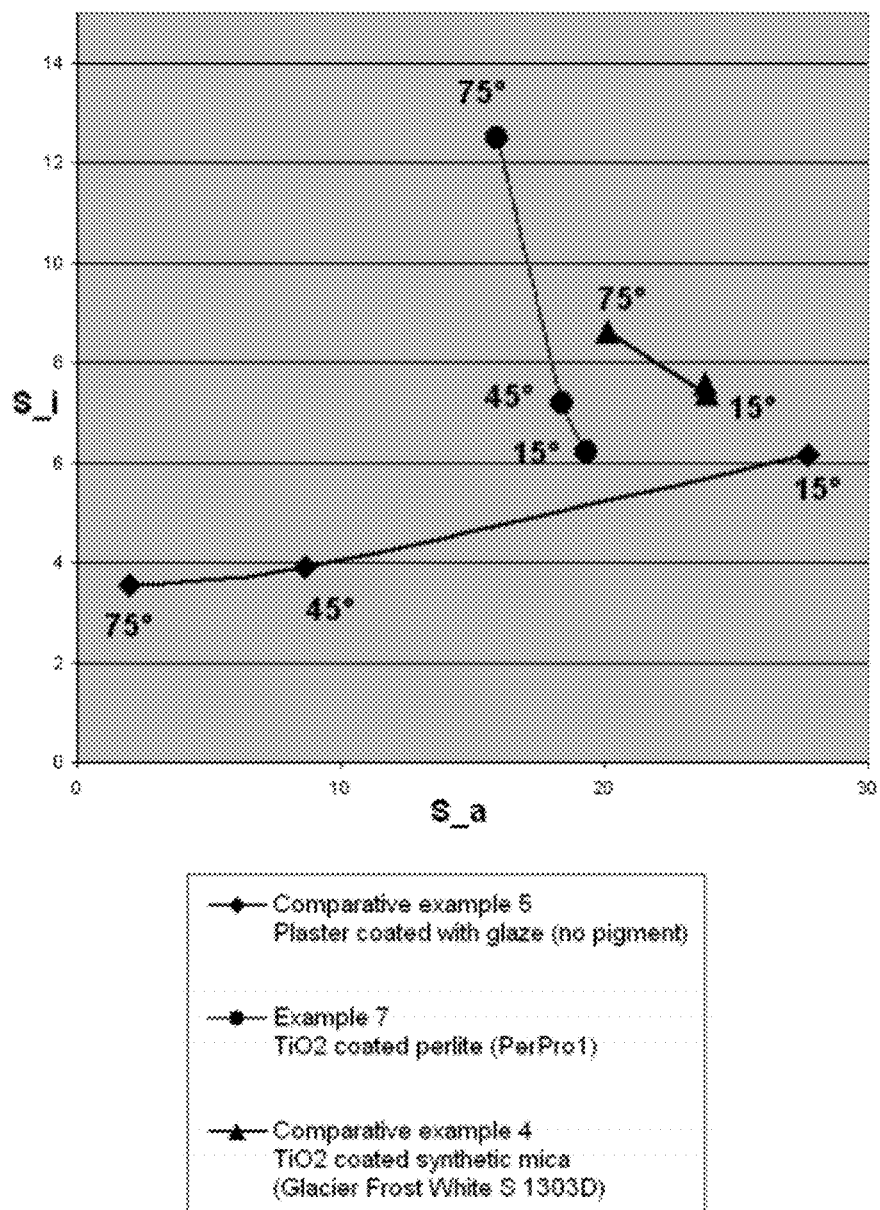

USE OF PERLITE BASED EFFECT PIGMENTS FOR FINISHES WITH ANTIQUE, OR PATINA APPEARANCE

CROSS REFERENCES

This application claims the benefit of U.S. Provisional Application No. 61/368,288, filed Jul. 28, 2010.

FIELD OF INVENTION

The present invention provides a process for imparting a simulated patina, or antique appearance to a substrate by using a coating composition comprising a perlite based effect pigment. The perlite based effect pigment functions as colorant and matting agent and shows an almost angle independent brightness. The process provides, for example, decorative wall coatings showing enhanced antique, or patina effects as compared to conventional effect pigments on basis of mica.

BACKGROUND

WO09/007,248 and WO2010/066605 relate to (interference) pigments having a core of perlite, comprising a layer of a dielectric material and/or a (thin semi-transparent) metal layer, a method of producing the (interference) pigments and their use in paints, ink-jet printing, for dyeing textiles, for pigmenting coatings, printing inks, plastics, cosmetics, glazes for ceramics and glass.

U.S. 61/255,514 relates to pigments with adjustable and/or improved sparkling effect comprising A) a plate-like substrate of perlite coated with (a) dielectric material and/or metal; and
B) a plate-like substrate of mica, coated with (a) dielectric material and/or metal;
and a process for their production and their use in paints, ink-jet printing, for dyeing textiles, for pigmenting coatings (paints), printing inks, plastics, cosmetics, glazes for ceramics and glass. The pigments show an improved sparkle effect; in particular an attractive high sparkle intensity.

U.S. 61/301,245 relates to pigment compositions with improved and adjustable sparkling effect comprising A) a platelet-like perlite; and B) an effect pigment;
and a process for their production and their use in paints, ink-jet printing, for dyeing textiles, for pigmenting coatings (paints), printing inks, plastics, cosmetics, glazes for ceramics and glass. The pigment compositions show an improved sparkle effect; in particular an attractive high sparkle intensity.

DESCRIPTION

Since many years the appearance of metallic surfaces is being copied by use of coatings containing pigments in flake form. During the application the pigment flakes align in a parallel way and thus the typical angle dependant lightness with high brightness in face angle and lower lightness in flop angle is achieved. Usually silver finishes are containing aluminum flakes or white micas (=titanium oxide coated micas without interference colors) in combination with carbon black. Golden, copper or russet finishes are based on iron oxide coated micas or alloys like brass, or bronze. Common feature of all those finishes is the imitation of metallic gloss.

If metals are exposed to air and humidity over a long time they are getting the so-called antique, or patina look.

Patina is a film on the surface of bronze or similar metals produced by oxidation over a long period, or by a chemical process. Patina is also used to describe a sheen on wooden furniture produced by age, wear, and polishing; or any such acquired change of a surface through age and exposure.

On metal, "patina" is a coating of various chemical compounds, such as oxides or carbonates, formed on the surface during exposure to the elements (weathering). "Patina" also refers to accumulated changes in surface texture and colour that result from normal use of an object such as a coin or a piece of furniture over time. The expression "patina" can refer to any fading, darkening or other signs of age, which are felt to be natural and/or unavoidable. Patina may also be measured by suitable instruments, e.g. those measuring angle-dependent lightness of a patinated subject, i.e. the variation in lightness concomitant with the angle of the viewer's position to the subject. In comparison to non-patinated subjects, the gloss of patinated subjects tends to be lower and/or less dependent from the angle of the viewer's position to the subject than the gloss of non-patinated subjects.

Nowadays the patina-effect is a very important tool in industrial design. Apart from the aesthetic appearance and practical protection of patination, an object's value increases because the slow aging process and his evidential history is seen as the opposite of the fast change in modern live. Especially in interior design there is a demand for things which seem to have a long history or which stand for long time periods. For that reason decorative coatings providing patina effect, antique appearance or worn-out look are an important tool in industrial design.

In coloristical terms patina or patination is related to a reduction in gloss and non-regular changes in color. Haptic properties and surface texture also change, because the patina layers might show a different porosity and heat conductivity than the original surface.

The chemical process by which a patina forms is taking a long time. Such type of patina is called "acquired patina".

The green patina that forms naturally on copper and bronze, usually consists of a mixture of chlorides, sulphides and carbonates, copper carbonate or copper chloride. It can form on pure copper objects as well as alloys which contain copper, such as bronze or brass. Such a patina layer takes many years to develop under natural weathering.

Usually nobody wants to wait such a long time if patina effects are used as design tool. Artists and designers often deliberately add patinas as a part of the original design and decoration of art and furniture, or to simulate antiquity in newly-made objects. For that reason the so called "applied patina" is of high industrial importance.

A wide range of chemicals, both household and commercial, can give a variety of patinas. They are often used by artists as surface embellishments either for color, texture, or both. Patination composition varies with the reacted elements and these will determine the color of the patina. For copper alloys, such as bronze, exposure to chlorides leads to green, while sulfur compounds (such as "liver of sulfur") tend to brown. The basic palette for patinas on copper alloys includes chemicals like ammonium sulfide (blue-black), liver of sulfur (brown-black), cupric nitrate (blue-green) and ferric nitrate (yellow-brown). For artworks, patination is often deliberately accelerated by applying chemicals with heat. Colors range from matte sandstone yellow to deep blues, greens, whites, reds and various grays and blacks. Some patina colors are achieved by the mixing of colors from the reaction with the metal surface with pigments added to the chemicals. All these chemical approaches to modify/patinate surfaces require handling of chemicals and are not convenient or even dangerous.

For that reason coatings, which provide the patina effect, are preferred versus surface treatments with less convenient chemicals.

Coatings providing a kind of patina effect are typically based on pigmentations with
- classical pigments like iron oxides, titanium oxides, chrome oxides or others;
- and optional effect pigments like metal oxide coated mica pigments or metal flakes, like aluminum, brass or bronze.

The choice of the right pigments depends mainly on the desired patina effect. The color of silver patina might be for example matched with a combination of titanium oxide, carbon black and titanium oxide coated micas. The color of copper patina could be matched with green pigments, like Pigment Green 7, or chrome (III) oxide in combination with titanium oxide coated micas, or iron oxide coated micas. For rusty surfaces iron oxide pigments and iron oxide coated micas might be a starting point.

One of the features of a patina coating is a lower gloss level than the original surface. To reduce the gloss of a coating matting agents on the basis of silicas, wax, organic materials or fillers are state of the art.

Silicas have a relatively high efficiency in terms of matting power. With higher concentration an increase in viscosity is possible. During storage they have a tendency to build up sediment, this is particularly the case with untreated silicas. To avoid this tendency combinations of silicas and wax or pyrogenic silicas are used. The most used waxes for coatings and inks are based on polyethylene, polypropylene, Carnauba, polyamid. Wax products based on polytetrafluorethylene (PTFE) are also used as matting agents.

By using fillers as matting agent the Pigment-Volume-Concentration of paint is a limiting factor. If a higher amount of matting agent is necessary to adjust the reduced gloss of a patina finish the amount of colored pigments automatically is limited to lower concentrations.

All of the methods described so far still do not show satisfying patina appearance. They are lacking the typical matte surface or show due to the use of gloss pigments based on mica or metal flakes untypical gloss effects or too strong sparkle. For that reason such coated objects easily are recognized as imitation of a patinated surface and thus are of lower value.

Accordingly, it is the object of the present invention to provide a coating composition providing strongly improved antique, or patina effect or in other words matte coatings without the deficiencies of the state of the art.

Surprisingly, it has been found that perlite based effect pigments described in WO09/007,248, WO2010/066605 and U.S. 61/255,514 can be used for finishes with strongly improved patina appearance.

The present invention relates to a process for imparting an antique appearance to a substrate, preferably, but not necessarily, to a "young" or recently manufactured substrate, wherein a suitable coating composition comprising a perlite based effect pigment (perlite based effect pigment composition) is applied to the surface of the substrate in a manner providing an inhomogenous and/or noncontinous appearance, where necessary or if desired, in cooperation or interaction with an additional colorant. Before or after applying the perlite based effect pigment, the substrate may be pretreated or after treated with a suitable (additional) colorant composition. In doing so, the perlite based effect pigment, or said colorant, or both the perlite based effect pigment and said colorant are partially and randomly applied, e.g by interspersing spots of said pigment and/or colorant, so as to achieve inhomogenous effects. The pigment and additional colorant may be arranged on top of each other, e.g. in a 2 coat arrangement, or they may be arranged side by side. Both the pigment and colorant may also be applied in randomly varying coat thicknesses and visible brushstrokes of randomly varying direction.

The above process may not only be used for imparting an antique appearance to a "young" or recently manufactured substrate, but also for modifying the potentially antique appearance of an old subject, i.e. to change an antique appearance into a different antique appearance according to individual design wishes.

A suitable coating composition comprising a perlite based effect pigment is one which provides the desired patina color tone, optionally together with the colorant composition.

A suitable colorant composition is e.g. one providing the desired initial color tone to the substrate, i.e. the original color of the material for which the antique, or patina effect should be simulated.

In the present text the term "inhomogenous" is preferably used to describe coloristical differences in hue, chroma and lightness, whereas the term "noncontinous" is preferably used to describe glossy and non glossy spots on a surface.

Example for "inhomogenous": A copper surface is totally (=continuously) covered with greenish to bluish (=inhomogenous) patina.

Example for "noncontinous": A rusty surface, where partially rust flakes are chipped off and glossy metal underneath is seen.

Accordingly, the present invention relates to a process for imparting a simulated patina, or antique appearance to a substrate comprising the steps of:

a) selecting a coating composition comprising a perlite based effect pigment (perlite based effect pigment composition) providing the desired patina color tone; and b) applying the perlite based effect pigment composition on the surface of the substrate to produce a continuous layer with inhomogenous appearance or, preferably, a noncontinuous layer of said perlite based effect pigment composition on the surface of the substrate to provide the appearance of patination of the desired patina color tone via a perlite based effect pigment finish [method A)];

or a1) selecting a coating composition comprising a colorant (colorant composition) providing the desired initial color tone to the substrate;

a2) selecting a coating composition comprising a perlite based effect pigment providing the desired patina color tone;

b1) applying the colorant composition on the surface of the substrate to produce a continuous layer of said colorant on the surface of the substrate to provide the appearance of the desired initial color tone on said substrate; and b2) applying the perlite based effect pigment composition on the colorant layer to produce a noncontinuous layer of said perlite based effect pigment composition on the colorant layer to provide the appearance of patination of the desired parina color tone via interspersed spots of a perlite based effect pigment finish [method B)];

or a1) selecting a coating composition comprising a colorant providing the desired initial color tone to the substrate;

a2) selecting a coating composition comprising a perlite based effect pigment providing the desired patina color tone;

b1) applying the perlite based effect pigment composition on the surface of the substrate to produce a continuous layer of said perlite based effect pigment composition on the surface of the substrate to provide the appearance of patination of the desired patina color tone via a perlite based effect pigment finish;

b2) applying the colorant composition on the effect pigment layer to produce a noncontinuous layer of said colorant on the effect pigment layer to provide the appearance of the desired initial color tone via interspersed spots of a colorant finish [method C)];

or a1) selecting a coating composition comprising a colorant providing the desired initial color tone to the substrate;

a2) selecting a coating composition comprising a perlite based effect pigment providing the desired patina color tone; and b1) applying the perlite based effect pigment composition and the colorant composition on the surface of the substrate to produce alternating layers of said colorant composition and said perlite based effect pigment composition on the surface of the substrate to provide the appearance of the desired initial color tone and the appearance of patination of the desired patina color tone on said substrate [method D)], wherein several perlite based effect pigment compositions may be used to create a patina with inhomogeneous appearance on the substrate, or the colorant layer.

Method B) is more preferred than method C). Method B) and D) are most preferred.

The initial color tone is the original color of the material for which the antique, or patina effect should be simulated. In case of a silver patina appearance the initial color tone is silver.

The simulated patina appearance may be a silver patina appearance. The perlite based effect pigment composition for providing a silver patina appearance may comprise perlite flakes coated with a 20 to 40 nm thick $TiO_2$ layer and a black pigment, or metalized perlite flakes having gray (grey) color. The colorant composition may comprise aluminum flakes, or mica flakes coated with a 20 to 40 nm thick $TiO_2$ layer and a black pigment.

The simulated patina appearance may be a copper patina appearance. The perlite based effect pigment for simulating a copper patina appearance may be selected from grey perlite based effect pigments, $TiO_2$ coated perlite pigment flakes showing green to blue interference colors, chrom(III) oxide ($Cr_2O_3$) coated perlite flakes and mixtures of said pigments. The colorant may be selected from copper shaded $Fe_2O_3$ coated mica pigments or platelike iron oxide.

Examples of grey perlite based effect pigments are metallized (Ag), $Fe_3O_4$, or carbon coated perlite pigments.

The simulated patina appearance may be a rust patina appearance. The perlite based effect pigment for simulating a rust patina appearance is selected from $Fe_2O_3$ coated perlite pigments, $Fe_2O_3/TiO_2$ coated perlite pigments, or mixtures of said pigments. The colorant may be selected from aluminum flakes, and white $TiO_2$ coated mica pigments in combination with black pigments, or iron flakes. Iron flakes are commercially available from Eckart under the tradename Ferricon®.

The simulated patina appearance may be a golden patina appearance. The perlite based effect pigment for simulating a golden patina appearance is selected from $TiO_2$ coated perlite pigments with golden interference color, $Fe_2O_3$ coated perlite pigments, $Fe_2O_3/TiO_2$ coated perlite pigments, or mixtures of said pigments. The colorant may be selected from iron oxide coated aluminum flakes, and golden $Fe_2O_3/TiO_2$ coated mica pigments. Iron oxide coated aluminum flakes are commercially available from BASF under the tradename Paliocrom®.

The substrates obtained according to the above process are new and form a further subject of the present invention. Accordingly, the present invention relates to substrates obtainable according to the process of the present invention.

The substrate obtained according to method A) contains a continuous, or preferably noncontinuous layer of a perlite based effect pigment composition on its surface.

Method B) produces a noncontinuous layer of the perlite based effect pigment composition on the colorant layer to provide the appearance of patination of the desired patina color tone via interspersed spots of a perlite based effect pigment finish.

Method C) produces a noncontinuous layer of the colorant on the effect pigment layer to provide the appearance of the desired initial color tone via interspersed spots of a colorant finish.

Method D) produces alternating layers of said colorant composition and said perlite based effect pigment composition on the surface of the substrate to provide the appearance of the desired initial color tone and the appearance of patination of the desired patina color tone on the substrate. The substrates obtained according to methods B), C) and D) are preferred. The substrates obtained according to methods B) and D) are preferred.

The process of the present invention is especially suitable for providing decorative wall coatings with an antique, or patina effect. The coating compositions may be applied by roller application, wiping techniques and/or brushing.

Accordingly, the present invention is also directed to a 2-coat arrangement, comprising (I) a (glossy) coating, comprising a colorant; and (II) a matte coating, comprising a perlite based effect pigment.

The coatings may be arranged on top of each other. In said embodiment the 2-coat arrangement comprises (I) a first glossy coating, comprising a colorant; and (II) a second matte coating, comprising a perlite based effect pigment (on the substrate). The inverse order is less preferred.

The coatings may be arranged side by side. The second matte coating may consist of different perlite based effect pigment compositions simulating different patina states.

In a further preferred embodiment the present invention is directed to the use of perlite based effect pigments for producing finishes with patina, or antique appearance. The perlite based effect pigments are used for producing finishes with matte appearance. They function simultaneously as colorant and matting agent.

Examples of colorants are organic and inorganic pigments. The colorant may be a mixture of one, or more pigments. Examples of colored organic pigments include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoisoindolinone, quinacridone, flavanthrone, indanthrone, anthrapyrimidine and quinophthalone pigments, or a mixture or solid solution thereof.

Examples of inorganic pigments are white pigments, such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate. In addition, examples of inorganic pigments include metal effect pigments, and effect pigments on basis of transparent substrates, which are different from perlite. Examples of suitable colorants are given below.

Perlite based effect pigments are pigments, comprising a plate-like substrate of perlite, and (a) a layer of a dielectric material; and/or (a') a metal layer.

The perlite based effect pigments impart color, pearlescence, sparkling and a matting effect to coating compositions used according to the present invention. The perlite based effect pigments may be used in combination with one, or more other pigments.

By adding effect pigments, which are different from perlite based effect pigments, such as, for example, (metal) oxide coated transparent substrates ((metal) oxide coated mica, glass flakes, $SiO_2$ and $Al_2O_3$ flakes) and metal effect pigments (Al flakes) the brightness, the sparkling and/or the color tone of the perlite based effect pigments can be modified.

The other effect pigments are used in amounts of 1 to 30% by weight, especially 1-10% by weight of, based on the sum of perlite based effect pigment and other effect pigment. By adding, for example, (metal) oxide coated glass flakes and $Al_2O_3$ flakes the sparkling effect and the brightness of the perlite based effect pigment can be variably adjusted.

The term "mica" comprises natural mica, such as, for example, biotite, vermiculite, sericite, muscovite, phlogopite, fluorophlogopite, kaolinite or related, as well as synthetic mica, such as, for example, synthetic fluorophlogopite.

The wording "comprising (a) a layer of a dielectric material and/or metal" means that the substrate can be coated with a layer of a dielectric material or a metal layer; or it can be coated with two, or more layers of dielectric material and/or metal. The dielectric materials and metals can be the same or different. Examples of so-called "multilayer" pigments are given below. The layer of a dielectric material is especially a (metal) oxide layer, having a high index of refraction.

The platelet-like substrate (core) of the pigments of the present invention consists of perlite. Perlite is a hydrated natural glass containing typically about 72-75% $SiO_2$, 12-14% $Al_2O_3$, 0.5-2% $Fe_2O_3$, 3-5% $Na_2O$, 4-5% $K_2O$, 0.4-1.5% CaO (by weight), and small concentrations of other metallic elements. Perlite is distinguished from other natural glasses by a higher content (2-10% by weight) of chemically bonded water, the presence of a vitreous, pearly luster, and characteristic concentric or arcuate onion skin-like (i.e., perlitic) fractures. Perlite flakes may be prepared by methods disclosed in WO02/11882 which may include thermal expansion, screening, and milling. Perlite flakes with controlled particle size distribution, low floater content, and high blue light brightness are preferred.

Perlite flakes having a median particle size ($D_{50}$) of less than 50 microns are preferred. Perlite flakes having a median particle size of from 15-50 microns are preferred and perlite flakes having a median particle size of from 20-40 microns are most preferred.

The perlite flakes have a floater content of less than 10 percent by volume; especially a floater content of less than 5 percent by volume; very especially a floater content of less than 2 percent by volume. The perlite flakes have a blue light brightness greater than 80; especially greater than 82; very especially greater than 85.

The perlite flakes used in the present invention are not of a uniform shape. The particles are not always perfectly flat, i.e. can be concave. Nevertheless, for purposes of brevity, the perlite flakes will be referred to as having a "diameter". The perlite flakes have an average thickness of <2 µm, especially of from 200 to 1000 nm, especially from 200 to 600 nm. It is presently preferred that the diameter (median particle size ($d_{50}$)) of the flakes be in a preferred range of about 15-50 µm with a more preferred range of about 20-40 µm.

The $Fe_2O_3$ content of the perlite is preferably below 2%, especially 0%.

The present most preferred perlite is Optimat™ 2550 (World Minerals). Perlites, like Optimat™ 1735 and 2040 (World Minerals) could also be used. Particles having a particle size below 5 µm and above 85 µm are preferably removed, for example, by sedimentation, or centrifugation.

The perlite core is either coated with a dielectric material, especially a metal oxide, having a high index of refraction, or a metal layer. Said layers can be coated with additional layers.

Suitable metals for the (semi-transparent) metal layer are, for example, Fe, Mo, Cr, Zn, Cu, Ag, Pd, or Pt. The metal layer has typically a thickness of between 5 and 100 nm, especially between 10 and 50 nm.

The metal layer can be obtained by wet chemical coating or by chemical vapor deposition, for example, gas phase deposition of metal carbonyls.

In one preferred embodiment of the present invention, the interference pigments comprise materials having a "high" index of refraction, which is defined herein as an index of refraction of greater than about 1.65, and optionally materials having a "low" index of refraction, which is defined herein as an index of refraction of about 1.65 or less. Various (dielectric) materials that can be utilized including inorganic materials such as metal oxides, metal suboxides, metal fluorides, metal oxyhalides, metal sulfides, metal chalcogenides, metal nitrides, metal oxynitrides, metal carbides, combinations thereof, and the like, as well as organic dielectric materials. These materials are readily available and easily applied by physical, or chemical vapor deposition processes, or by wet chemical coating processes.

Optionally a $SiO_2$ layer can be arranged between the perlite substrate and the materials having a "high" index of refraction. By applying a $SiO_2$ layer on the perlite substrate the perlite surface is protected against chemical alteration, such as, for example, swelling and leaching of perlite components. The thickness of the $SiO_2$ layer is in the range of 5 to 200 nm, especially 20 to 150 nm. The $SiO_2$ layer is preferably prepared by using an organic silane compound, such as tetraethoxy silane (TEOS).

In an especially preferred embodiment, the effect pigments on the basis of the perlite substrate comprise a layer of a dielectric material having a "high" refractive index, that is to say a refractive index greater than about 1.65, preferably greater than about 2.0, most preferred greater than about 2.2, which is applied to the entire surface of the perlite substrate. Examples of such a dielectric material are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide (HfO$_2$), lanthanum oxide (La$_2$O$_3$), magnesium oxide (MgO), neodymium oxide (Nd$_2$O$_3$), praseodymium oxide (Pr$_6$O$_{11}$), samarium oxide (Sm$_2$O$_3$), antimony trioxide (Sb$_2$O$_3$), silicon monoxides (SiO), selenium trioxide (Se$_2$O$_3$), tin oxide (SnO$_2$), tungsten trioxide (WO$_3$), or combinations thereof. The dielectric material is preferably a metal oxide. It being possible for the metal oxide to be a single oxide or a mixture of oxides, with or without absorbing properties, for example, TiO$_2$, ZrO$_2$, Fe$_2$O$_3$, Fe$_3$O$_4$, Cr$_2$O$_3$ or ZnO, with TiO$_2$ being especially preferred.

It is possible to obtain pigments that are more intense in colour and more transparent by applying, on top of the TiO$_2$ layer, a metal oxide of low refractive index, such as SiO$_2$, Al$_2$O$_3$, AlOOH, B$_2$O$_3$ or a mixture thereof, preferably SiO$_2$, and optionally applying a further TiO$_2$ layer on top of the latter layer (EP-A-892832, EP-A-753545, WO93/08237, WO98/53011, WO9812266, WO9838254, WO99/20695, WO0/42111, and EP-A-1213330). Nonlimiting examples of suitable low index dielectric materials that can be used include silicon dioxide (SiO$_2$), aluminum oxide (Al$_2$O$_3$), and metal fluorides such as magnesium fluoride (MgF$_2$), aluminum fluoride (AlF$_3$), cerium fluoride (CeF$_3$), lanthanum fluoride (LaF$_3$), sodium aluminum fluorides (e.g., Na$_3$AlF$_6$ or Na$_5$Al$_3$F$_{14}$), neodymium fluoride (NdF$_3$), samarium fluoride (SmF$_3$), barium fluoride (BaF$_2$), calcium fluoride (CaF$_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, the disclosure of which is incorporated herein by reference.

Accordingly, preferred interference pigments comprise besides (a) a metal oxide of high refractive index in addition (b) a metal oxide of low refractive index, wherein the difference of the refractive indices is at least 0.1.

Pigments on the basis of perlite substrates, which have been coated by a wet chemical method, in the indicated order are particularly preferred:
TiO$_2$, (SnO$_2$)TiO$_2$ (substrate: perlite; layer: (SnO$_2$)TiO$_2$, preferably in the rutile modification), titanium suboxide, TiO$_2$/titanium suboxide, Fe$_2$O$_3$, Fe$_3$O$_4$, TiFe$_2$O$_5$, Cr$_2$O$_3$, ZrO$_2$, Fe$_2$O$_3$.TiO$_2$ (substrate: perlite; mixed layer of Fe$_2$O$_3$ and TiO$_2$), TiO$_2$/Fe$_2$O$_3$ (substrate: perlite; first layer: TiO$_2$; second layer: Fe$_2$O$_3$), TiO$_2$/Cr$_{203}$, or TiO$_2$/FeTiO$_3$. In general the layer thickness ranges from 1 to 1000 nm, preferably from 1 to 300 nm.

In another particularly preferred embodiment the present invention relates to interference pigments containing at least three alternating layers of high and low refractive index, such as, for example, TiO$_2$/SiO$_2$/TiO$_2$, (SnO$_2$)TiO$_2$/SiO$_2$/TiO$_2$, TiO$_2$/SiO$_2$/TiO$_2$/SiO$_2$/TiO$_2$, Fe$_2$O$_3$/SiO$_2$/TiO$_2$, or TiO$_2$/SiO$_2$/Fe$_2$O$_3$.
Preferably the layer structure is as follows:
(a) a coating having a refractive index>1.65,
(b) a coating having a refractive index≤1.65,
(c) a coating having a refractive index>1.65, and
(d) optionally an outer protective layer.
The thickness of the individual layers of high and low refractive index on the base substrate is essential for the optical properties of the pigment. The thickness of the individual layers, especially metal oxide layers, depends on the field of use and is generally 10 to 1000 nm, preferably 15 to 800 nm, in particular 20 to 600 nm.

The thickness of layer (A) is 10 to 550 nm, preferably 15 to 400 nm and, in particular, 20 to 350 nm. The thickness of layer (B) is 10 to 1000 nm, preferably 20 to 800 nm and, in particular, 30 to 600 nm. The thickness of layer (C) is 10 to 550 nm, preferably 15 to 400 nm and, in particular, 20 to 350 nm.

Particularly suitable materials for layer (A) are metal oxides, metal sulfides, or metal oxide mixtures, such as TiO$_2$, Fe$_2$O$_3$, TiFe$_2$O$_5$, Fe$_3$O$_4$, BiOCl, CoO, CO$_3$O$_4$, Cr$_2$O$_3$, VO$_2$, V$_2$O$_3$, Sn(Sb)O$_2$, SnO$_2$, ZrO$_2$, iron titanates, iron oxide hydrates, titanium suboxides (reduced titanium species having oxidation states from 2 to <4), bismuth vanadate, cobalt aluminate, and also mixtures or mixed phases of these compounds with one another or with other metal oxides. Metal sulfide coatings are preferably selected from sulfides of tin, silver, lanthanum, rare earth metals, preferably cerium, chromium, molybdenum, tungsten, iron, cobalt and/or nickel.

Particularly suitable materials for layer (B) are metal oxides or the corresponding oxide hydrates, such as SiO$_2$, MgF$_2$, Al$_2$O$_3$, AlOOH, B$_2$O$_3$ or a mixture thereof, preferably SiO$_2$.

Particularly suitable materials for layer (C) are colorless or colored metal oxides, such as TiO$_2$, Fe$_2$O$_3$, TiFe$_2$O$_5$, Fe$_3$O$_4$, BiOCl, CoO, CO$_3$O$_4$, Cr$_2$O$_3$, VO$_2$, V$_2$O$_3$, Sn(Sb)O$_2$, SnO$_2$, ZrO$_2$, iron titanates, iron oxide hydrates, titanium suboxides (reduced titanium species having oxidation states from 2 to <4), bismuth vanadate, cobalt aluminate, and also mixtures or mixed phases of these compounds with one another or with other metal oxides. The TiO$_2$ layers can additionally contain an absorbing material, such as carbon, selectively absorbing colorants, selectively absorbing metal cations, can be coated with absorbing material, or can be partially reduced.

Interlayers of absorbing or nonabsorbing materials can be present between layers (A), (B), (C) and (D). The thickness of the interlayers is 1 to 50 nm, preferably 1 to 40 nm and, in particular, 1 to 30 nm. Such an interlayer can, for example, consist of SnO$_2$. It is possible to force the rutile structure to be formed by adding small amounts of SnO$_2$ (see, for example, WO93/08237).

In this embodiment preferred interference pigments have the following layer structure:

| Perlite | TiO$_2$ | SiO$_2$ | TiO$_2$ |
|---|---|---|---|
| Perlite | TiO$_2$ | SiO$_2$ | Fe$_2$O$_3$ |
| Perlite | TiO$_2$ | SiO$_2$ | TiO$_2$•Fe$_2$O$_3$ |
| Perlite | TiO$_2$•Fe$_2$O$_3$ | SiO$_2$ | TiO$_2$•Fe$_2$O$_3$ |
| Perlite | TiO$_2$ | SiO$_2$ | MoS$_2$ |
| Perlite | TiO$_2$ | SiO$_2$ | Cr$_2$O$_3$ |
| Perlite | Cr$_2$O$_3$ | SiO$_2$ | TiO$_2$ |
| Perlite | Fe$_2$O$_3$ | SiO$_2$ | TiO$_2$ |
| Perlite | TiO$_2$ | Al$_2$O$_3$ | TiO$_2$ |
| Perlite | Fe$_2$TiO$_5$ | SiO$_2$ | TiO$_2$ |
| perlite | TiO$_2$ | SiO$_2$ | Fe$_2$TiO$_5$/TiO$_2$ |
| perlite | TiO$_2$ | SiO$_2$ | TiO$_2$/SiO$_2$/TiO$_2$ |
| perlite | TiO$_2$/SiO$_2$/TiO$_2$ | SiO$_2$ | TiO$_2$/SiO$_2$/TiO$_2$ | wherein tin dioxide can be deposited before titanium dioxide.

Layers of oxides of the metals zirconium, titanium, iron and zinc, oxide hydrates of those metals, iron titanates, titanium suboxides or mixtures thereof are preferably applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-14 67 468, DE-A-19 59 988, DE-A-20 09 566, DE-A-22 14 545, DE-A-22 15 191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, WO 93/08237, WO 98/53001 and WO03/6558.

The metal oxide of high refractive index is preferably $TiO_2$ and/or iron oxide, and the metal oxide of low refractive index is preferably $SiO_2$. Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735,114, DE-A-3433657, DE-A-4125134, EP-A-332071, EP-A-707,050, WO93/19131, or WO06/131472.

To enhance the weather and light stability the (multilayer) perlite flakes can be, depending on the field of application, subjected to a surface treatment. Useful surface treatments are, for example, described in DE-A-2215191, DE-A-3151354, DE-A-3235017, DE-A-3334598, DE-A-4030727, EP-A-649886, WO97/29059, WO99/57204, and U.S. Pat. No. 5,759,255. Said surface treatment might also facilitate the handling of the pigment, especially its incorporation into various application media.

Perlite based effect pigments are of most interest, which are suited to provide the desired patina color tone, optional in combination with classical organic and inorganic pigments, or which are suited to imidate a metallic appearance:

silver colored $TiO_2$ coated perlite pigments (geometrical thickness of $TiO_2$ layer ca. 20 to 40 nm);

$TiO_2$ coated perlite pigments having a golden interference color;

$TiO_2$ coated perlite pigments having a green interference color (copper patina);

golden, bronze, copper, or rust shaded $Fe_2O_3$ coated perlite pigments;

golden, bronze, copper, or rust shaded $Fe_2O_3/TiO_2$ coated perlite pigments;

green colored $Cr_2O_3$ coated perlite pigments;

green colored $Cr_2O_3/TiO_2$ coated perlite pigments;

metal coated perlite pigments having a grey to dark grey appearance; and $Fe_3O_4$ coated perlite pigments having a grey appearance.

In principal, multilayer pigments having enhanced light reflection and chroma may be used instead of the above-mentioned lower-cost pigments.

The perlite based pigments described above are used to match the coloristical appearance of patinated metal surfaces, such as, for example, of silver, iron or copper.

Silver Patina

Patinated or antique silver is darkened and reduced in gloss. This appearance can be ideally matched by using titanium oxide coated perlite pigments with a thin $TiO_2$-layer without interference color (geometrical thickness of $TiO_2$ layer: ca. 20-40 nm) in combination with black pigments. Such a pigment is showing in combination with black pigments (e.g.) a grey to black color with reduced gloss.

Examples of black pigments are carbon black, graphite, or inorganic blacks, like magnetite, cobalt ferrites, or chrome iron titanate.

Preferably several coating compositions comprising different amounts of perlite and black pigment(s) are used to achieve an inhomogeneous finish on the substrate.

Classical effect pigments, like $TiO_2$ coated mica, or aluminum flakes, might also be present. They can be used to adjust or modify the gloss or sparkle level of the $TiO_2$ coated perlite pigments/carbon black blend.

Typical coating compositions comprise:

A) $TiO_2$ coated perlite pigments in an amount of 1 to 99% by weight,

B) black pigment in an amount of 1 to 99% by weight, and

C) $TiO_2$ coated mica, or aluminum flakes in an amount of 0-90% by weight, wherein components A), B) and C) sum up to 100% by weight.

If carbon black is used a lighter silver patina finish is achieved with a pigment ratio of for example 95 to 98% by weight $TiO_2$ coated perlite pigments and 5 to 2% by weight carbon black.

Darker silver patina is typically containing 70 to 90% by weight $TiO_2$ coated perlite pigments and 30 to 10% by weight carbon black.

Less preferred are extremely dark finishes with a ratio of 5% by weight $TiO_2$ coated perlite pigments and 95% by weight carbon black.

In a further embodiment of the present invention 0-90% of other effect pigments like $TiO_2$-coated mica or Al-flakes can be added (see above typical composition A)+B)+C)). In that case the amount of $TiO_2$ coated micas or aluminum is below 30% by weight, especially below 10% by weight, if the matte finish is modified by adding a coarse pearl pigment, or aluminum flakes in order to provide some sparkling highlights to the matte finish.

If carbon black is used as black pigment preferably 30% by weight or less of carbon black are used to provide the desired effect of darkened silver. The amount of carbon black is especially below 10% by weight.

If inorganic blacks are used ($Fe_3O_4$, cobalt ferrites and the like) a higher content of black pigment is necessary due to higher density (=lower tinting strength) of inorganic blacks. The preferred range of inorganic black pigment is then 1 to 60% by weight, based on the amount of perlite effect pigment and inorganic black pigment.

A preferred embodiment of the invention is the imitation of only partially patinated silver surfaces. If for example only a part of a silver surface was exposed to air and humidity the non exposed part is still glossy and only the exposed part is darker and matte.

Such inhomogeneous effects can be matched by using a combination of classical silver pigments, such as, for example, aluminum flakes (cornflake, silver dollar or VMP-type), or $TiO_2$-coated (natural, or synthetic) micas (preferred diameter: 15-25 μm; thickness of $TiO_2$ layer: ca. 20-40 nm) with perlite effect pigments.

For example, the 2-coat arrangement shown below can provide such an effect:

First (Glossy Silver) Coating:

Aluminum based paint (coating composition), or white mica/carbon black based paint;

Second (Matte) Coating:

$TiO_2$ coated perlite pigments/carbon black based paint.

Also possible, but less preferred because less authentical is the other way round with the glossy silver coating on top of the matte perlite coating, or only one coating with the matte and the glossy coating side by side and in between a gradient of both.

Also suitable for patinated silver finishes are metalized perlite flakes with gray color. Suitable metals are all metals which can be applied via chemical vapor deposition (CVD) (Fe, Cr, Mo, or Zn), physical vapor deposition (PVD), or wet chemical deposition (Cu, Ag, Pd, or Pt).

Golden Patina

Golden patina can be imitated by using for example in a first layer a classical golden effect pigment with high gloss, such as, for example, golden $Fe_2O_3/TiO_2$ coated mica pigments, (golden mica pigments), or aluminum flakes coated with transparent iron oxides (commercially available from BASF under the tradename Paliocrom® Gold). The perlite component can be selected from $TiO_2$ coated perlite pigments with golden interference color, $Fe_2O_3$ coated perlite pigments, and $Fe_2O_3/TiO_2$ coated perlite pigments.

Rusty Surfaces

The rusty appearance of oxidized iron surfaces can be matched by using perlite flakes comprising a coating containing iron oxide, such as, for example, $Fe_2O_3$, $TiFe_2O_5$, $Fe_2O_3 \cdot TiO_2$ (substrate: perlite; mixed layer of $Fe_2O_3$ and $TiO_2$), $TiO_2/Fe_2O_3$ (substrate: perlite; first layer: $TiO_2$; second layer: $Fe_2O_3$), $Fe_2O_3/TiO_2$ and $TiO_2/FeTiO_3$.

In general preferred are simple pigments with one iron oxide layer on the perlite substrate.

Also preferred are perlite flakes comprising an iron oxide layer and additional layers of non-absorbing materials, such as, for example, $TiO_2$, $ZrO_2$, $SiO_2$, and $Al_2O_3$.

In contrast to finishes based on iron oxide coated micas the finish based on iron oxide coated perlite pigments is showing a strongly reduced gloss level with a similar chroma. The best colormatch of a rusty surface is provided by a combination of several shades of iron oxide coated perlite pigments. Main color should be brownish $Fe_2O_3$ coated perlite pigments in combination with a smaller amount of more yellowish $Fe_2O_3$ coated perlite pigments (=thinner $Fe_2O_3$ layer) and more reddish $Fe_2O_3$ coated perlite pigments (=thicker $Fe_2O_3$ layer).

In general the $Fe_2O_3$ layer has a thickness of from 10 to 200 nm, preferably 20 to 100 nm.

A preferred embodiment is to coat a surface first with the brownish $Fe_2O_3$ coated perlite pigments and then overcoat partially with the yellowish and the reddish $Fe_2O_3$ coated perlite pigments.

Also possible is to coat simultaneously one layer by using 2-3 spray guns with different shades of $Fe_2O_3$ coated perlite pigments.

The $Fe_2O_3$ coated perlite based pigments can also be combined with yellow to red classical organic or inorganic pigments. Preferred are iron oxide pigments of all shades and chemistries ($Fe_2O_3$, $Fe_3O_4$, FeOOH etc.). Yellow bismuth vanadate pigments may also be used.

In principle, combinations of classical iron oxide pigments with perlite effect pigments are possible in a range of from 95% be weight iron oxide pigments:5% by weight perlite effect pigments to 5% by weight iron oxide pigments: 95% by weight perlite effect pigments. In preferred embodiments of the present invention the perlite component is contained in an amount of at least 50% by weight and more preferred at least 70% by weight, based on the amount of perlite effect pigment(s) and iron oxide pigment(s).

If desired, the gloss or sparkling level of the $Fe_2O_3$ coated perlite; or $Fe_2O_3$ coated perlite/iron oxide blend can be modified by adding classical oxide coated mica pigments, or iron oxide coated aluminum pigments. If coarse oxide coated flakes are added sparkling highlights are possible. The preferred amount of the additional pigment components is below 10% by weight, based on the amount of perlite effect pigment(s), iron oxide pigment(s) and additional components.

Green Surfaces

The greenish appearance of patinated copper containing alloys, or copper itself can be matched in various ways with perlite based effect pigments.

In principle perlite based effect pigments have to be combined with organic or inorganic classical pigments. To adjust the gloss or sparkling level classical oxide coated flakes (mica, aluminum, or glass) can be added.

The perlite based effect pigment is preferably neutral in color (=grey), or greenish/bluish. The latter are typically chrom(III) oxide coated perlite flakes, or $TiO_2$ coated perlite flakes with green to blue interference colors.

If $TiO_2$ coated perlite pigments with thin $TiO_2$ layers is used the greenish appearance of patinated copper surfaces is easily achieved by a combination with green, blue and black pigments. The inhomogeneous appearance of a copper patina surface is achieved by using more than 2 colors with variations in shade, chroma and lightness.

In this preferred embodiment a patina finish based on a silver $TiO_2$ coated perlite pigments and green pigments, such as, for example, Pigment Green 7, is stippled on top of a coating with classical iron oxide coated mica with copper color.

For example, the 2-coat system shown below can provide such an effect:

First (Glossy Copper) Coating:
  Copper shaded $Fe_2O_3$-coated (natural, or synthetic) mica based paint,
Second (Matte) Coating:
  $TiO_2$ coated perlite pigments/carbon black based paint, including yellow, green and/or blue classical organic and inorganic pigments.

Also possible is to stipple the patina color based on perlite effect pigment and green pigments on top of a brass colored coating of $Fe_2O_3$ coated mica, or $Fe_2O_3/TiO_2$ coated mica.

For example, the 2-coat system shown below can provide such an effect:

First (Glossy Copper) Coating:
  brass colored $Fe_2O_3$ coated mica, or $Fe_2O_3/TiO_2$ coated mica based paint,
Second (Matte) Coating:
  $TiO_2$ coated perlite pigments/carbon black based paint, including yellow, green and/or blue classical organic and inorganic pigments.

Also possible, but less preferred because less authentical is the other way round with the glossy copper coating on top of the matte perlite coating, or only one coating with the matte and the glossy coating side by side and in between a gradient of both.

The process of the present invention is especially suitable for generating decorative wall coatings showing an antique, or patina effect.

The first essential constituent of the coating composition of the invention is at least one (water-soluble, -dilutable and/or -dispersible) binder (A).

The binder (A) is preferably selected from the group consisting of ionically stabilized, ionically and nonionically stabilized, random, alternating and block, linear, branched and comb addition (co)polymers of ethylenically unsaturated monomers, polyaddition resins and/or polycondensation resins which are curable physically, thermally, with actinic radiation, and thermally and with actinic radiation. Regarding these terms, refer for further details to Rompp Lexikon Lacke and Druckfarben, Georg Thieme Verlag, Stuttgart, N.Y., 1998, page 457, "Polyaddition" and "Polyaddition resins (polyadducts)", and also pages 463 and 464, "Polycondensates", "Polycondensation" and "Polycondensation resins".

The binders (A) are preferably selected from the group consisting of (meth)acrylate (co)polymers, partially hydrolyzed polyvinyl esters, polyesters, alkyds, polylactones, polycarbonates, polyethers, epoxy resin-amine adducts, polyureas, polyamides, polyimides and polyurethanes, especially (meth)acrylate copolymers and polyurethanes.

The polyurethanes (A) are known per se and are described, for example, in DE19914896A1, DE4438504A1, DE19904624A1, DE4107136A1, DE19904317A1.

The (meth)acrylate copolymers (A) are also known per se and are described in detail, for example, in DE19924172A1, DE19730535A1, or WO99/10439A.

With particular preference the binders (A) are selected from the group consisting of (A1) (meth)acrylate copolymers containing in copolymerized form from 30 to 60% by weight of $C_1$ $C_8$alkyl(meth)acrylates, from 30 to 60% by weight of vinylaromatic monomers, and from 0.5 to 10% by weight of (meth)acrylic acid, based in each case on the (meth)acrylate copolymer, and (A2) polyurethanes preparable by subjecting an ethylenically unsaturated monomer or a mixture of ethylenically unsaturated monomers to free-radical polymerization in an aqueous dispersion of a polyurethane resin having a number-average molecular weight Mn of from 1 000 to 30 000 daltons and containing on average per molecule from 0.05 to 1.1 polymerizable double bonds and in the presence of a water-insoluble initiator or of a mixture of water-insoluble initiators, the weight ratio between the polyurethane resin and the ethylenically unsaturated monomer or mixture of ethylenically unsaturated monomers being between 1:10 and 10:1.

Accordingly, the acrylate dispersion (A1) may be prepared by prior art methods. The proportion between the monomers and the water may be selected so that the resulting dispersion has a solids content of preferably from 30 to 60% by weight.

The amount of the acrylate dispersion (A1) in the coating material of the invention may vary widely and is guided by the requirements of the case in hand. The amount is preferably from 1 to 30%, more preferably from 2 to 25%, with particular preference from 3 to 20%, and in particular from 4 to 15%, by weight, based in each case on the overall amount of the coating material of the invention.

The further essential constituent of the coating composition of the invention is at least one (effect) pigment (B) (=colorant; or perlite based effect pigment).

The pigment concentration (B) of the coating composition may vary very widely and is guided primarily by the effect that is to be set and/or by the opacity of the color pigments. The pigment concentration is preferably situated at a total of from 3 to 65% by weight, based on the solids of the coating material of the invention.

The pigments (B) may be added to the coating composition of the invention in any way desired, e.g., as an aqueous slurry or as a paste. Such pastes preferably include a dispersing binder, preferably a polyurethane-based binder, such as, for example, the polyurethane resins described in DE4010176A1 or DE4107136 A1, at least one of the rheological aids described below, deionized water, at least one organic solvent, and the pigment or a mixture of pigments. Where aluminum metallic pigments are used, they may be slurried in solvents and, possibly, in a mixture of water and wetting agent or may be dispersed in the main binder or in another, auxiliary binder.

With particular preference, however, the (effect) pigments (B) are dispersed, in accordance with the process of the invention, together with at least one silicon compound (C) that is to be used in accordance with the invention, in particular in at least one organic solvent, and then the aqueous dispersion of at least one binder (A) and, where appropriate, further customary and known constituents are added, and the resulting mixture is homogenized.

Examples of suitable organic solvents are alcohols such as methanol, ethanol, propanol, isopropanol, n-butanol, sec-butanol, tert-butanol, amyl alcohol, isoamyl alcohol, 1-hexanol, 1-heptanol, 1-octanol, 2-octanol, isooctanol, 1-nonanol, 1-decanol, 2-decanol, 1-undecanol, 1-dodecanol, 1-tridecanol, 2-tridecanol, ethyl glycol, ethyl diglycol, methyl glycol, methyl diglycol, propyl glycol, propyl diglycol, butyl glycol or butyl diglycol or diols such as ethylene glycol, diethylene glycol, propylene glycol, dipropylene glycol, the butylene glycols or dibutylene glycol, amides such as N-methylpyrrolidone or xylenes or mixtures of aromatic and/or aliphatic hydrocarbons such as Solventnaphtha®, petroleum spirit 135/180, dipentenes or Solvesso®.

The third constituent of the coating composition may be a silicon compound (C). The silicon compounds (C) are customary and known compounds and are disclosed, for example, in EP0401496B1, U.S. Pat. No. 5,100,955, WO99/52964, DE19726829A1, DE19910876A1, DE3828098A1, EP0450625A1.

Highly suitable silicon compounds (C) are also sold under the brand name WETLINK® by Compton Europe.

The amount of the silicon compounds (C) in the coating material of the invention may vary widely and is guided by the requirements of the case in hand, in particular by the functionality of the binders (A) and the number of reactive functional groups on the surface of the pigments (B). The silicon compounds (C) are preferably used in an amount such that there are from 0.1 to 2 mol of silicon compound (C) per mole of binder (A) and from 0.1 to 2 mol of silicon compound (C) per mole of pigment (B).

In addition to the constituents (A), (B) and (C) described above, the coating composition may comprise further constituents.

The coating material of the invention may further comprise rheological aids. Suitable rheological aids include, in particular, synthetic polymers containing ionic and/or associative groups. Examples thereof are polyvinyl alcohol, poly(meth)acrylamide, poly(meth)acrylic acid, polyvinylpyrrolidone, styrenemaleic anhydride or ethylene-maleic anhydride copolymers and derivatives thereof, or else hydrophobically modified ethoxylated urethanes or polyacrylates.

The rheological aid is present in the coating material of the invention preferably in an amount of from 0.01 to 5.0% by weight, in particular from about 0.1 to 1% by weight, based on the solids content.

Examples of further suitable rheological aids are xanthan gum, diurea compounds, polyurethane thickeners, bentonite, waxes and wax copolymers, and, preferably, ionic phyllosilicates, and mixtures thereof.

Particularly preferred rheological aids comprise mixtures of the aforementioned synthetic polymers with ionic or associative groups, and the ionic phyllosilicates.

The coating materials of the invention may further comprise at least one mixture of at least one polysiloxane defoamer, at least one hydrophobic solid, and at least one polyglycol. The mixtures are products that are known per se and are sold, for example, by Byk Chemie under the brand name Byk® 028.

The coating composition may further comprise customary and known crosslinking agents. As crosslinking agents it is possible in particular to use the crosslinkers known in the coatings field, such as melamine resins, blocked polyisocyanates and/or tris(alkoxycarbonylamino)triazines. Examples of these and further suitable crosslinking agents are described in DE19924170A1, DE19914896 A1.

Insofar as the coating materials of the invention are to be curable with actinic radiation, especially UV radiation, as well, they may further comprise customary and known constituents curable with actinic radiation, and photoinitiators. Examples of suitable constituents and photoinitiators are described in DE19908013A1 and DE19818735A1.

The coating compositions generally have a solids content of preferably from 10 to 70% by weight. The solids content varies with the intended use of the coating materials of the invention.

The coating materials of the invention are preferably applied to a substrate surface which has been coated with a customary primer-surfacer or, where appropriate, to a substrate surface which has already been coated with a first, preferably aqueous, basecoat material, such as a low-build primer-surfacer.

The suitable substrates include all surfaces to be coated that are undamaged by curing of the coatings present thereon using heat or heat and actinic radiation. Suitable substrates consist for example of metals, plastics, wood, ceramic, stone, textile, fiber composites, leather, glass, mineral- and resin-bound building materials, such as plasterboard panels and cement slabs or roof tiles, and composites of these materials. The surfaces of these materials may already have been painted or coated beforehand.

Following the application of the primer-surfacer or of the first basecoat material, the coating material of the invention or the aqueous basecoat material is applied in a manner known per se, by spraying, brushing, dipping, flow coating, knife coating or rolling, for example, to the substrate.

Following their application, the films are cured thermally, or thermally and with actinic radiation.

The coating compositions are outstandingly suitable for producing decorative, effect paint systems on the interior and exterior of buildings (decorative wall paints).

Wall paints may be applied to vertical walls using a variety of well known methods, such as brush, roller, or commercial grade airless sprayer.

Wall paint compositions can further comprise various conventional paint additives, such as dispersing aids, fillers, anti-settling aids, wetting aids, thickening agents, extenders, plasticizers, stabilizers, light stabilizers, antifoams, defoamers, catalysts, texture-improving agents and/or antiflocculating agents. Conventional paint additives are well known. The amounts of such additives are routinely optimized by the ordinary skilled artisan so as to achieve desired properties in the wall paint, such as thickness, texture, handling, and fluidity.

Wall paint compositions may comprise various rheology modifiers or rheology additives, wetting agents, defoamers, dispersants and/or co-dispersants, and microbicides and/or fungicides. To achieve enhanced weatherability, the wall paints may comprise UV (ultra-violet) absorbers.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

BRIEF DESCRIPTION OF DRAWINGS

FIG. 1 is a graph showing the angle dependant lightness of a white plaster coated with a $TiO_2$ coated perlite pigment based finish in comparison with a white plaster coated with a $TiO_2$ coated mica pigment based finish and a white plaster coated with a finish containing no pigment.

FIG. 2 is a graph showing the Sparkling intensity (S_i) vs. the Sparkling area (S_a) [illumination angle: 75°, 45° and 15° from the left hand side to ride hand side] of a white plaster coated with a $TiO_2$ coated perlite pigment based finish in comparison with a white plaster coated with a $TiO_2$ coated mica pigment based finish and a white plaster coated with a finish containing no pigment.

EXAMPLES

As substrates plates of fiber cement (Eterplan plates, Eternit A G Heidelberg) are used. For design reasons the plates are precoated with a white fine-sized plaster (Caparol-Streichputz: matte, fine synthetic rosin plaster for thick plastic exterior coatings with good filling characteristics, CAPAROL Farben Lacke Bautenschutz GmbH; Ober-Ramstadt) that provides a corrugated texture by using brushing techniques during application.

For design reasons the plaster is mass-colored in some of the examples.

The binder for the patina finishes is based on Acronal® LR-9014 (BASF SE Ludwigshafen). For a better incorporation into the binder all effect pigments have been stirred into a propylene glycol slurry (20% by weight effect pigment).

Preparation of $TiO_2$ Coated Perlite Pigments (PerPro1)

Perlite flakes are prepared as described in Example 1 of WO2010/066605:

a) Perlite flakes (Optimat™ 2550 from World Minerals) are homogeneously dispersed in deionized water in an amount of 10% by weight. The particles are let to settle 5 minutes and the settled particles are removed from the suspension. The operation is repeated 3 times. Said operation allows to "sharpen" the particle size distribution by taking out the very coarse end of particles.

b) Then the particles in suspension are let to settle during 8 hours. After that the water containing the smallest particles of perlite is disgarded. The operation is repeated 3 times. Then the particles are filtered and dried. The particle size distribution of the obtained perlite particles (=PerPro1), measured by laser (He—Ne laser 632.8 nm) light diffraction with a Malvern Mastersizer S Longbench, shows the following parameters:

| D (v, 0.1) µm | D (v, 0.5) µm | D (v, 0.9) µm |
|---|---|---|
| 12.6 | 28.7 | 56.9 |

Example 1

Finish for Silver Patina with Inhomogeneous Appearance a) Pretreatment of Fiber Cement Plate with Grey Plaster
White plaster is tinted by use of 0.2% by weight Luconyl® Black 0066 (Carbon Black in aqueous dispersion; BASF SE). By use of a brushing technique the grey plaster is applied onto the plate of fiber cement. After 12 h drying time the silver patina coating is applied.

b) Composition of the Silver Patina Coating
The silver patina finish is made by using the combinations i) and ii) below:

i) First a dispersion based on Acronal® 9014 (aqueous dispersion of a copolymer of 2-ethylhexyl acrylate and methyl methacrylate; BASF SE) is tinted with 0.25% by weight Luconyl® Black 0066. After addition of 10% by weight $TiO_2$ coated perlite pigment (PerPro1) (preslurried in propylene glycole) a light grey shade is obtained.

ii) In a second container a darker grey is made by tinting a dispersion based on Acronal® 9014 with 1.25% by weight Luconyl® Black 0066. After addition of 10% by weight $TiO_2$ coated perlite pigment (PerPro1) (preslurried in propylene glycole) a darker grey shade is obtained.

Compositions i) and ii) are applied contiguously onto the pretreated fiber cement plate by brushing.

Example 2

Finish for Silver Patina with Homogeneous Appearance a) Pretreatment of Fiber Cement Plate with Grey Plaster
White plaster is tinted by use of 0.2% by weight Luconyl® Black 0066. By use of a brushing technique the grey plaster is applied onto the plate of fiber cement. After 12 h drying time the silver patina coating is applied.

b) Composition of the Silver Patina Coating
The silver patina finish is made by using the following composition:
First a dispersion based on Acronal® 9014 is tinted with 0.25% by weight Luconyl® Black 0066. After addition of 10% by weight (PerPro1) (preslurried in propylene glycole) a light grey shade is obtained. The dispersion having a grey shade is applied onto the pretreated fiber cement plate by brushing.

Comparative Example 1

Instead of $TiO_2$ coated perlite pigment (PerPro1) a $TiO_2$ coated synthetic mica is used (Glacier Frost White S 1303D, BASF SE). While the finish has high lightness in face and dark appearance in down-flop, it is not perceived as silver patina.

Example 3

Finish for Partially Patinated Silver Surface

A finish with only partial patina character is achieved by use of a combination of the coatings described in Example 1 and Comparative Example 1. The pretreated fiber cement plate is brushed with the dispersion described in Comparative Example 1. Then the compositions described in Example 1 are stippled randomly onto the glossy coating.

Preparation of iron oxide coated perlite pigment via chemical vapour deposition (PerPro2 and PerPro3)

600 g of Perlite flakes (Optimat™ 2550 from World Minerals) are filled into the CVD-reactor which has already been described in EP-A-45851 (glass cylinder with a diameter of 15 cm, gas injection below the glass frit, glass cylinder length of 80 cm, lower end of the reactor is closed with a glass frit, the upper end with is closed with a cover plate with integrated filters, electric heating band wrapped around the glass cylinder) and fluidized with a nitrogen stream of 900 l/h. After heating the reactor up to 185° C. a content of 2.5 vol % of air is adjusted via a second gas stream of air. An additional nitrogen gas stream (200 l/h) is saturated with iron pentacarbonyl and continuously injected into the reactor. The progress of the iron oxide coating is controlled by taking samples each hour. After 11 hours 450 ml $Fe(CO)_5$ have been transferred as vapor into the reactor and decomposed to thin iron oxide films on the surface of the perlite substrates. At the end a russet effect pigment (PerPro2) is obtained, which shows the following particle sizes a after 32μ-sieving:

| D (v, 0.1) μm | D (v, 0.5) μm | D (v, 0.9) μm |
| --- | --- | --- |
| 9.4 | 25.1 | 51.5 |

A copper shaded effect pigment (PerPro3) with same particle size distribution is obtained according to the above-mentioned procedure, if the coating process is stopped after having transferred and decomposed 395 ml $Fe(CO)_5$ into the reactor.

A pale golden shaded effect pigment (PerPro4) with same particle size distribution is obtained according to the above-mentioned procedure, if the coating process is stopped after having transferred and decomposed 300 ml $Fe(CO)_5$ into the reactor.

Example 4

Rusty Finish with Inhomogeneous Appearance a) Pretreatment of Fiber Cement Plate with Brown Plaster
White plaster is tinted by use of 5.94% by weight Luconyl® Red 2817 (aqueous dispersion of transparent iron oxide; BASF SE) and traces of Luconyl® Black 0066. By use of a brushing technique the brownish plaster is applied onto the plate of fiber cement. After 12 h drying time the rust patina coating is applied.

b) Composition of the Rust Patina
The rusty finish is made by using the following compositions
i) A dispersion based on Acronal® 9014 is tinted with 1.67% by weight Luconyl® Yellow 1100 (Bismutvanadat; BASF SE). Then 10% by weight of a copper shaded iron oxide coated perlite pigment (PerPro2, preslurried in propylene glycole) are added.
ii) A dispersion based on Acronal® 9014 is tinted with 3.3% by weight Luconyl® Red 2817. Then 10% by weight of a russet shaded iron oxide coated perlite pigment (PerPro3, preslurried in propylene glycole) are added.

Both dispersions i) and ii) are applied contiguously onto the pretreated fiber cement plate by brushing.

Comparative Example 2

Instead of $Fe_2O_3$-coated perlite pigments PerPro2 and PerPro3 iron oxide coated micas (Lumina Copper 3503D and Lumina Russet 4503D, both BASF SE) are used. While the finish has high lightness in face and dark appearance in down-flop, it is not perceived as a rusty iron oxide surface.

Example 5

Finish for Copper Patina with Typical Inhomogeneous Appearance a) Pretreatment of Fiber Cement Plate with Greenish Plaster White plaster is tinted by use of 0.53% by weight g Luconyl® Yellow 1100 and 0.83% by weight Luconyl® Blue 7080 (beta copper phthalocyanine; BASF SE) and traces of Luconyl® Black 0066. By use of a brushing technique the greenish plaster is applied onto the plate of fiber cement. After 12 h drying time the copper patina coating is applied.

b) Composition of the Copper Patina

The copper patina finish is made by using the following compositions i) A dispersion based on Acronal® 9014 is tinted with 0.34% by weight Luconyl® Yellow 1100, 0.6% by weight Luconyl® Blue 7080 and traces of Luconyl® Black 0066. Then 10% by weight of a silver shaded $TiO_2$ oxide coated perlite pigment (PerPro1, preslurried in propylene glycole) are added.

ii) A dispersion based on Acronal® 9014 is tinted with 0.66% by weight Luconyl® Yellow 1100, 0.2% by weight Luconyl® Green 8730 (chlorinated copper Phthalocyane; BASF SE) and traces of Luconyl® Black 0066. Then 10% by weight of a silver shaded $TiO_2$ oxide coated perlite pigment (PerPro1, preslurried in propylene glycole) are added.

iii) A dispersion based on Acronal® 9014 is tinted with 0.75% by weight Luconyl Yellow 1100 and traces of Luconyl® Black 0066.

Then 10% by weight of a silver shaded $TiO_2$ oxide coated perlite pigment (PerPro1, preslurried in propylene glycole) are added.

All three dispersions i), ii) and iii) are applied contiguously onto the pretreated fiber cement plate by brushing.

Comparative Example 3

Instead of silver $TiO_2$-coated perlite pigment (PerPro1) a $TiO_2$-coated synthetic mica is used (Glacier Frost White S 1303D, BASF SE). While the finish has similar color however high lightness in face and dark appearance in down-flop, it is not perceived as a copper patinated surface.

Example 6

Finish for a Partially Patinated Copper Surface

A finish with only partial patina character is achieved by use of a combination of a glossy i) and a patina finish ii), iii) and iv).

i) A dispersion based on Acronal® 9014 is tinted with 10% by weight of a copper shaded iron oxide coated mica (Lumina Copper 3503D, preslurried in propylene glycole).

ii) A dispersion based on Acronal® 9014 is tinted with 0.34% Luconyl® Yellow 1100, 0.6% Luconyl® Blue 7080 and traces of Luconyl® Black 0066.

Then 10% by weight of a silver shaded $TiO_2$ oxide coated perlite pigment (PerPro1, preslurried in propylene glycole) are added.

iii) A dispersion based on Acronal® 9014 is tinted with 0.66% Luconyl® Yellow 1100, 0.2% Luconyl® Green 8730 and traces of Luconyl® Black 0066. Then 10% by weight of a silver shaded $TiO_2$ oxide coated perlite pigment (PerPro1, preslurried in propylene glycole) are added.

iv) A dispersion based on Acronal® 9014 is tinted with 0.75% Luconyl® Yellow 1100 and traces of Luconyl® Black 0066.

Then 10% of a silver shaded $TiO_2$ oxide coated perlite pigment (PerPro1, preslurried in propylene glycole) are added.

First of all the substrate is homogeneously coated with finish i). Then the patina finishes ii), iii) and iv) are only partially and randomly applied on the copper surface.

Example 7

Finish for a Matte Pearl Appearance

Pretreatment of Fiber Cement Plate with White Plaster a) By use of a brushing technique the white plaster is applied onto the plate of fiber cement. After 12 h drying time the matte pearl coating is applied.

b) Composition of the Matte Pearl Patina

A dispersion based on Acronal® 9014 is tinted with 10% $TiO_2$-coated perlite pigment (PerPro1, preslurried in propylene glycole). The dispersion is applied by rolling onto the pretreated fiber cement plate.

After drying the plate is showing reduced gloss of almost the same lightness level in all viewing angles. The finish with the perlite based effect pigment shows a subtle and reluctant sparkle effect with higher sparkle intensity in down flop than in face view. The graininess is low.

Comparative Example 4

Example 7 is repeated, except that instead of the perlite based pigment (PerPro1) a white pearl pigment based on synthetic mica (Glacier Frost White S 1303D) is applied. After drying the plate shows high lightness in face angle and dark appearance in down flop.

Comparative Example 5

Example 7 is repeated, except that the Acronal® dispersion is used without any pigment. After drying the plate shows glossy appearance with higher lightness in face than in flop angle.

The Flopindex of a white plaster coated with a $TiO_2$ coated perlite pigment based finish in comparison with a white plaster coated with a $TiO_2$ coated mica pigment based finish and a white plaster coated with a finish containing no pigment is shown below:

| Finish | Pigment | Flop Index[1] |
|---|---|---|
| Example 7 | $TiO_2$ coated perlite pigment | 0.50 |
| Comparative Example 4 | $TiO_2$ coated synthetic mica pigment | 2.95 |
| Comparative Example 5 | — | 0.61 |

[1] The flop index is calculated as follows: $F_i = 2.68 \times (L^*_{15°} L^*_{101°})^{1.11}/L^*_{45°}{}^{0.86}$. Flop Index is the measurement on the change in reflectance of a metallic color as it is rotated through the range of viewing angles.

A flop index of 0 indicates a solid color, while a very high flop metallic or pearlescent basecoat/clearcoat color may have depending on the application a flop index of >10.

The finish of Example 7 has a lower flop index than the finishes of Comparative Example 4 and 5. That means, the finish of Example 7 has less angle dependant brightness and is more matte as compared to the finishes of Comparative Example 4 and 5.

The graininess of a white plaster coated with a $TiO_2$ coated perlite pigment based finish in comparison with a white plaster coated with a $TiO_2$ coated mica pigment based finish and a white plaster coated with a finish containing no pigment is shown below:

| Finish | Pigment | Graininess |
| --- | --- | --- |
| Example 7 | $TiO_2$ coated perlite pigment | 3.5 |
| Comparative Example 4 | $TiO_2$ coated synthetic mica pigment | 6.2 |
| Comparative Example 5 | — | 1.8 |

The finish of Example 7 has a lower graininess than the finish of Comparative Example 4. That means, the finish of Example 7 produces relatively smooth surface textures as compared to the finish of Comparative Example 4, or in other words coatings with perlite based effect pigments hide surface defects much more than conventional effect pigments based on flat substrates.

FIG. 1 is a graph showing the angle dependant lightness of a white plaster coated with a $TiO_2$ coated perlite pigment based finish in comparison with a white plaster coated with a $TiO_2$ coated mica pigment based finish and a white plaster coated with a finish containing no pigment. The test system is a white plaster coated with a decorative glaze (10% by weight effect pigment).

As evident from FIG. 1 the white plaster coated with a $TiO_2$ coated perlite pigment based finish has most angle independent gloss.

Quantitative Determination of the Angle Dependant Sparkling Behavior

The sparkling effects of a white plaster coated with a $TiO_2$ coated perlite pigment based finish in comparison with a white plaster coated with a $TiO_2$ coated mica pigment based finish and a white plaster coated with a finish containing no pigment are measured using a Byk-mac device from Byk-Gardner GmbH (Lausitzer Staße 8, 82538 Geretsried, Germany). This device is allowing to measure sparkle and graininess for flake characterization. Accordingly, the sparkling behaviour of the products is characterized for three different illumination angles (direct illumination: 15°, 45° and 75° from perpendicular; camera detection: 0°) with the following parameters:

Sparkling area (S_a) corresponds to the number of light reflections within the measuring given;

Sparkling intensity (S_i) corresponds the intensity of the light reflections.

FIG. 2 is a graph showing the Sparkling intensity (S_i) vs. the Sparkling area (S_a) [illumination angle: 75°, 45° and 15° from the left hand side to ride hand side] of a white plaster coated with a $TiO_2$ coated perlite pigment based finish in comparison with a white plaster coated with a $TiO_2$ coated mica pigment based finish and a white plaster coated with a finish containing no pigment. The test system is a white plaste coated with a decorative glaze (10% by weight effect pigment; roller application).

The white plaster coated with a $TiO_2$ coated perlite pigment based finish shows an improved sparkle effect; in particular an attractive high sparkle intensity at higher angles. This is an advantage, because for example walls are seen much more often at steeper viewing angles.

Example 8

Finish for a Partially Patinated Golden Surface

A finish with only partial patina character is achieved by use of a combination of a glossy i) and a patina finish ii).
i) A dispersion based on Acronal® 9014 is tinted with 10% by weight of a gold shaded iron oxide coated mica (Lumina Brass 2323D, preslurried in propylene glycole).
ii) A dispersion based on Acronal® 9014 is tinted with 3.3% by weight Luconyl® Red 2817. Then 10% by weight of a pale gold shaded iron oxide coated perlite pigment (PerPro4, preslurried in propylene glycole) are added.

First of all the substrate is homogeneously coated with finish i). Then the patina finish ii) is only partially and randomly applied on the gold surface.

The invention claimed is:

1. A process for imparting a simulated patina to a substrate comprising the steps of applying a colorant coating composition to the surface of the substrate to produce a continuous layer of said colorant coating composition on the surface of the substrate thereby providing an initial color tone on said substrate; and applying a perlite based effect pigment composition on the colorant layer to produce a noncontinuous layer of said perlite based effect pigment composition on the colorant layer, thereby providing the simulated patina via interspersed spots of the initial color tone and the perlite based effect pigment finish,
   wherein said simulated patina simulates age and/or exposure to the elements,
   wherein several perlite based effect pigment compositions may be used to create a patina with inhomogeneous appearance on the colorant layer, and
   wherein the simulated patina appearance is a silver, copper, rust, or golden patina appearance.

2. The process according to claim 1, wherein the simulated patina appearance is a silver patina appearance and the perlite based effect pigment composition comprises perlite flakes coated with a 20 to 40 nm thick $TiO_2$ layer and a black pigment, or metalized perlite flakes having grey color.

3. The process according to claim 2, wherein the colorant composition comprises aluminum flakes, or mica flakes coated with a 20 to 40 nm thick $TiO_2$ layer and a black pigment.

4. The process according to claim 1, wherein the simulated patina appearance is a copper patina appearance.

5. The process according to claim 4, wherein the perlite based effect pigment is selected from grey perlite based effect pigments, $TiO_2$ coated perlite pigment flakes showing green to blue interference colors, chrom (III) oxide ($Cr_2O_3$) coated perlite flakes and mixtures of said pigments.

6. The process according to claim 5, wherein the colorant is selected from copper shaded $Fe_2O_3$ coated mica pigments or platelike iron oxide.

7. The process according to claim 1, wherein the simulated patina appearance is a rust patina appearance.

8. The process according to claim 7, wherein the perlite based effect pigment is selected from $Fe_2O_3$ coated perlite pigments, $Fe_2O_3/TiO_2$ coated perlite pigments, or mixtures of said pigments.

9. The process according to claim 8, wherein the colorant is selected from aluminum flakes, and white $TiO_2$ coated mica pigments in combination with black pigments, or iron flakes.

10. The process according to claim 1, wherein the simulated patina appearance is a golden patina appearance.

11. The process according to claim 10, wherein the perlite based effect pigment is selected from $TiO_2$ coated perlite pigments with golden interference color, $Fe_2O_3$ coated perlite pigments, $Fe_2O_3/TiO_2$ coated perlite pigments, or mixtures of said pigments.

12. A process of using perlite based effect pigments as colorant and matting agent in a 2-coat arrangement for producing finishes with patina, comprising the steps of
   selecting a first coating comprising a colorant,
   selecting a second coating comprising a perlite based effect pigment, and
   applying the first and the second coatings to the surface of a substrate,
   wherein said simulated patina simulates age and/or exposure to the elements,
   wherein the simulated patina is a silver, copper, rust, or golden patina appearance.

\* \* \* \* \*